Sept. 27, 1966   T. M. WILLIAMS   3,274,868
SYSTEM FOR CUTTING FIBERGLASS DUCT BOARD
Filed Jan. 6, 1965   2 Sheets-Sheet 1
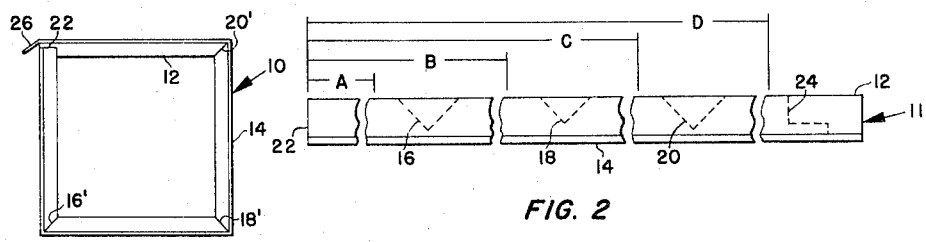
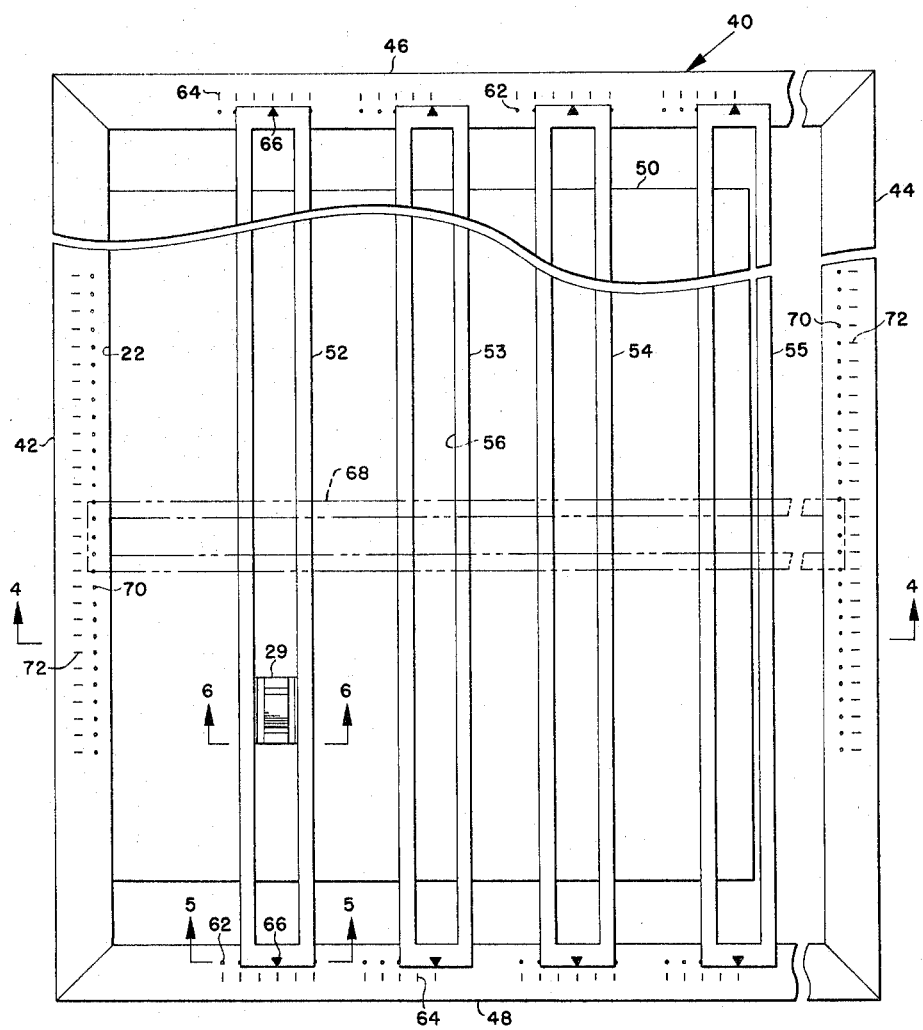
FIG. 3
INVENTOR.
THEODORE M. WILLIAMS
BY
Baldwin & Martin
ATTORNEYS Sept. 27, 1966     T. M. WILLIAMS     3,274,868
SYSTEM FOR CUTTING FIBERGLASS DUCT BOARD
Filed Jan. 6, 1965     2 Sheets-Sheet 2

INVENTOR.
THEODORE M. WILLIAMS
BY
*Baldwin & Martin*
ATTORNEYS

United States Patent Office 3,274,868
Patented Sept. 27, 1966

3,274,868
SYSTEM FOR CUTTING FIBERGLASS DUCT BOARD
Theodore M. Williams, 979 Volusia Ave., Daytona Beach, Fla.
Filed Jan. 6, 1965, Ser. No. 423,666
8 Claims. (Cl. 83—5)

This invention relates to a novel and improved means for preparing fiberglass duct board for forming into a duct. In recent years fiberglass ducts have come into fairly wide use in air conditioning and hot air heating systems. Such ducts are normally fabricated from a flat, rectangular duct board, consisting of a relatively thick layer of fiberglass wool backed by a layer or sheet of aluminum-faced fabric or the like. The board is cut to provide a plurality of V-shaped grooves in the fiberglass wool side of the board, with the grooves extending in parallel-spaced relation to each other and to a selected edge of the board. Also, it is common practice to provide an additional cut in the fiberglass, extending parallel to the grooves, which cut, at least in part, provides a lap joint with the opposite edge of the board when the board is folded along the grooves to provide a polygonal cross-sectioned duct. It will be apparent that the spacing the V-shaped grooves and the joint cut must be accurately determined in order to assure that the resulting duct will have the desired cross-sectional dimensions and will reliably mate with other duct lengths formed in the same manner, so that the duct lengths may be joined in end-to-end relationship in the over-all installation. Correspondingly, any errors in the layout or cutting of the fiberglass duct board may result in the duct having a cross-sectional size or configuration which will preclude its use with other properly cut ducts, resulting in a substantial loss in view of the expense of the raw material and the time required to layout and cut a duct which is not usable.

Accordingly it is the primary object of the present invention to provide novel and improved template means for use in cutting flat, fiberglass duct board to provide the grooves therein necessary to the subsequent formation of a duct from the board, whereby the user will be assured that the board will be cut accurately to provide a duct of desired, cross-sectional configuration and dimensions, and further will be assured that each board cut will correspond with other boards cut in the same manner, thus assuring that the ducts will properly mate with each other in the installation.

It is further an object of this invention to provide such novel and improved template means for use in the cutting of fiberglass duct board which is particularly adapted for use on the site of the duct installation, and which may be readily transported from one site to another.

It is further an object of this invention to provide such a novel and improved template means for use in cutting fiberglass duct board which may be readily and accurately used by a workman having little skill without fear of error, and which is relatively simple and economical in construction so as to be practical for use by small as well as large contractors.

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings, in which:

FIG. 1 is an end view of a partially completed fiberglass duct;

FIG. 2 is a fragmentary end view of a flat fiberglass duct board prior to the cutting and folding thereof to provide a duct;

FIG. 3 is a plan view of a device for use in cutting fiberglass duct board constructed in accordance with the present invention;

Figure 4:
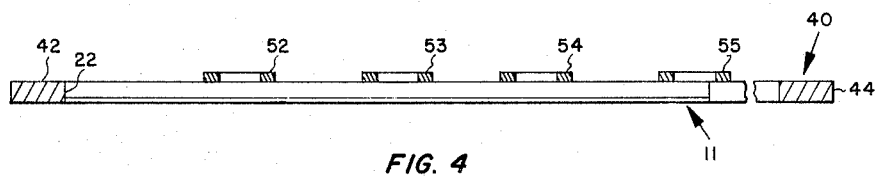
FIG. 4 is a cross-sectional view, substantially along the line 4—4 of FIG. 3.
Figure 5:
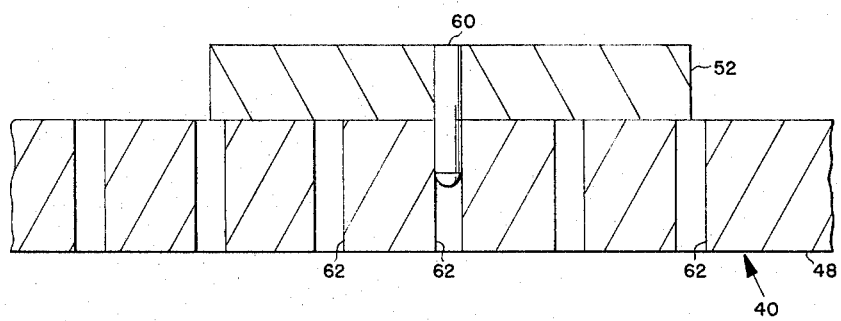
FIG. 5 is an enlarged cross-sectional view substantially the line 5—5 of FIG. 3.

With reference to the drawings and particularly FIG. 1, there is shown at 10 a partially completed fiberglass duct of a type with which this invention is concerned. The duct is formed from a flat fiberglass board 11 which as shown in FIGS. 1 and 2 comprises a relatively thick layer 12 of fiberglass wool backed by a thin layer 14 which may comprise a sheet of fabric faced on the side thereof next adjacent the fiberglass with aluminum foil or the like to improve the thermal insulating qualities of the duct. With reference to FIG. 2 the duct board is initially of flat rectangular configuration. A plurality of V-shaped grooves as indicated in broken lines at 16, 18 and 20 are provided in the fiberglass layer 12 with the grooves extending parallel to one longitudinal edge 22 of the board. The grooves are provided in the side of the board opposite the backing layer 14 and extend into the fiberglass layer 12 to terminate short of the backing layer 14. The grooves extend the full length of the edge 22 of the board, and at least one of the grooves, such as at 18, is preferably of a depth substantially less than that of the remaining grooves. Prior to setting up the board into a duct, the board is provided with an additional cut as at 24. The cut 24 extends parallel to the grooves 20 and on the side of the grooves opposite the edge 22.

When the fiberglass wool 12 to the right, as viewed in FIG. 2, of the cut 24, is removed, the remaining edge of the board will extend parallel to the edge 22 and will have a stepped portion which, as shown in FIG. 1, is cooperable with the edge to provide a lapped joint. The backing layer 14 to the right of the cut 24, as viewed in FIG. 2, is not removed, thereby leaving a flap 26 as shown in FIG. 1 after the edges of the board have been overlapped. The board is folded along the grooves 16, 18 and 20 which have an included angle of 90°, thus forming mitre joints 16', 18' and 20' when the board is folded into the rectangular configuration shown in FIG. 1. Where the duct is other than a rectangle, the included angles of the grooves would be determined by the number of sides of the desired polygonal cross-section of the duct. After the board has been folded into the duct form which in FIG. 1, the flap 26 is stapled to the next adjacent side of the duct, and a tape is cemented along the flap and underlying side of the duct. The opposite ends of the duct board are cut prior to forming the duct to provide a joint configuration cooperable with a mating joint configuration on a next adjacent duct. For example, the board is cut so that there will be a male and a female ship lap joint at the opposite ends respectively of the duct.

Figure 6:
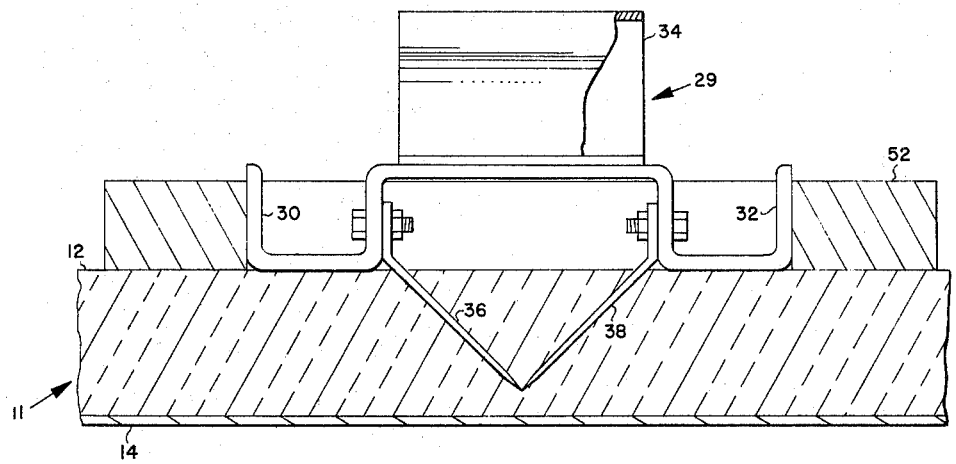
FIG. 6 is an enlarged, fragmentary, cross-sectional view substantially along the line 6—6 of FIG. 3.

In cutting the grooves 16, 18 and 20, and joint cut 24, it is essential that the spacing of the grooves and joint cut relative to each other and the guide edge 22 be accurate and that the grooves and joint cut be parallel to the edge 22 in order that the final duct will be of the proper size and configuration. With reference to FIG. 6, there is shown a commercially available cutting tool 29 for providing the V-shaped grooves 16 and 20. This tool comprises a body having parallel sides 30, 32 and an upwardly extending handle 34. A pair of triangular shaped blades 36, 38 are mounted on the body of the tool and depend therefrom. The bases of the blades are fixed to the tool body and the blades are inclined toward each other at an included angle of 90° with the apexes of the blades being aligned and spaced apart longitudinally of the tool body. It will be apparent from FIG. 6 that as the tool is moved along the duct board the blades 36, 38 will cut a V-shaped incision in the fiberglass. The incised portion of the fiberglass within the angle of the incision may thereafter be lifted out to provide the desired grooves. The tool for forming the groove 18 is substantially the same as the tool 29 except that the cutting blades are shorter in length. The tool for forming the joint cut 24 has a body similar to the body of the tool 29 but the blades are configured to provide the joint cut desired.

In making the various cuts on the board it will be apparent that the workman must determine, in the case of a rectangular cross-sectioned duct, four dimensions. These dimensions are indicated in FIG. 2 generally at A, B, C and D, each dimension which represents the spacing of the edge 30 of the appropriate tool from the guide edge 22 of the board. It should also be apparent, from a consideration of FIG. 1, that these four dimensions are not equal in view of the overlap joint between the two free edge portions of the board and due to the fact that the groove at 18 has a lesser depth than the other two grooves, 16 and 20. For example, using a commercially available tool to provide a cut having a 10″ x 10″ inside dimension from a board approximately 1″ thick, the dimension A would be 9 13/16″, the dimension B, 20 7/8″, the dimension C, 32 7/16″ and the dimension D, 44 3/16″. Thus, it will be apparent that the dimension A as well as the difference between the dimensions B and A, C and D and D and C are each different from the others.

When a workman prepares to cut a board, he must first determine the dimensions A, B, C and D, and then lay out these dimensions on the board, place a straightedge or the like on the board and make the cuts desired, using the straight-edge as a guide for the tool. The calculations required to determine the dimensions A–D present opportunity for error in the final duct configuration, and also, the layout of the board to indicate the location of the various cuts presents another opportunity for error. In all, the various calculations and operations, including the cutting of a 4′ x 10′ board in its longitudinal direction, may take as much as 25 to 30 minutes, thus materially increasing the cost of the over-all installation.

In accordance with the primary objects of this invention, I provide a device or template with which a duct board may be readily cut by a person of little skill to provide a duct of the desired cross-sectional dimensions and configuration with an accuracy and speed not attainable with the aforedescribed method of cutting the board. More particularly, and with reference to FIGS. 3 to 6, the template comprises an open frame, generally indicated at 40, and which in the specific embodiment shown comprises four sides, 42 and 44, and two ends, 46 and 48. The ends and sides may be fabricated of any suitable material but preferably one which will not warp and which is of light weight although rugged. The ends and sides are joined at the corners of the frame to provide a generally open, rectangular configuration having a central area for the reception of a rectangular duct board as indicated at 50. The sides and ends may be permanently joined together or suitable means, not shown, may be provided for dismantling the frame to facilitate transportation thereof from one site to another.

The template 40 is provided with a plurality of tool engageable guide means each of which is engageable by a tool for providing the desired cut in a duct board received within the frame 40. More particularly, and in the specific embodiment shown, a plurality of guide members, 52–55, are provided on the frame. Four such guide members are shown, although it will be apparent that a varying number could be provided depending upon the cross-sectional configuration desired for the duct. The guide members 52–55 are each provided with a slot 56 extending through the guide member and longitudinally thereof for the reception of a tool such as 29, whereby the tool will be guided accurately as it is moved longitudinally of the guide member. The guide members extend over the central opening in the frame so that, as will be seen in FIGS. 4 to 6, the guide members will overlie in closely adjacent relation, if not engagement with, the duct board received within the frame. The guide members are spaced apart relative to each other and the inner edge of the side 42 of the frame by distances selected to assure that the cuts made with the tools associated with the guide members will provide a duct of the desired cross-sectional dimensions. As will be observed from FIGS. 3 and 4, the length and width of the opening in the frame for receiving the duct board 50 are substantially greater than the length and width of the duct board. In the specific embodiment shown, the duct board 50 is of a nominal maximum dimension of 4′ x 10′, although it will be appreciated that smaller boards might be utilized with the device. More particularly, the length of the opening in the frame for receiving the duct board is greater than the maximum nominal length of the board by an amount at least equal to twice the length of the tools. This permits the board to be located within the frame so that its opposite ends are spaced from the ends 44 and 48 of the frame, and the tools may be inserted and withdrawn from the ends of the slots in the guide members prior to and at the end of a cut, thus facilitating the cutting operation.

In accordance with another aspect of the invention, means are provided for locating each of the guide members in a selected one of a plurality of positions spaced apart laterally of the guide members, or in other words laterally of the edge 22 of the duct board. In the specific embodiment shown, and with reference to FIGS. 3 and 5, each of the guide members is provided at each of its ends with a depending locating pin or dowel 60, which is receivable in a selected one of a plurality of openings, as at 62, in the end members 46 and 48 of the frame. The openings 62 on each of the end members are aligned in a series extending at right angles to the guide members. The pins 60 on each guide member are aligned with, or are in alignment parallel to, the longitudinal axis of the guide member. The openings 62 on the end member 46 are aligned with the openings 62 on the end member 48. As indicated at 64 in FIG. 3, indicia is associated with each of the openings 62 along at least one of the end members of the frame. These indicia provide a visual indication to the workman of the proper position of each guide member with respect to a particular size duct. In this connection, each of the guide members is further provided with an indicator marking, as at 66, which is alignable with one of the indicia 64 when the guide member is mounted on the frame with the pins on the guide members engaged in aligned openings on the opposite end members of the frame.

The indicia 64 may be of any suitable type which will facilitate the use of the device, for example, assuming that the guide members as shown in FIG. 3 are properly positioned for the cutting of a board to form a duct having a square cross section of 10″ inside dimensions, the indicia 62 in registry with the indicators 66 could be a marking 10″ x 10″. Further, the markings could be coded to mate with a master index or chart where, for example, the indicia on the frame members respectively associated with the openings 62 might be numbered, and the master chart would indicate by reference to these numerals the location of the guide members for a specific size duct. Purely as an illustration, such a chart might indicate that for a 10″ x 10″ inside demensioned duct the guide members should be located so that the indicators 66 match with the numerals 4, 11, 15 and 22. For a different size duct the chart would indicate that the indicators 66 should be matched with different indicia on the frame. Thus, the user need merely locate the guide members either by direct reference to the indicia on the frame or by reference first to a master chart and then by reference to the indicia on the frame. In this manner there is no room for error so long as the user locates the guide members in the proper position, and no mathematical calculations are necessary.

The accuracy of the cut in the duct board is assured by the fact that the slots in the guide members extend parallel to the side edges of the frame or, in other words, the guide edge 22 of the duct board where this edge abuts the frame member 42. While the guide members have been shown as provided with a slot within which a tool is slidably engageable, if desired each guide member could merely have a straight edge against which the side of the tool would be slidably engageable. When it is desired to change the location of a guide member, it is merely necessary to lift the guide member to disengage the pins 60 from the then engaged holes in the frame and reinsert the pins 60 in different holes corresponding to the desired position of the guide member and desired dimensions of the duct to be formed from the board cut using this device. The embodiment of FIG. 1 has been described above in connection with its use to provide cuts longitudinally of an elongated, rectangular duct board. In this connection, when the duct board is inserted into the frame, one longitudinal edge 22 is engaged with the edge of the frame 42 which extends parallel to the guide members, thus providing a stop or locating means for the duct board to assure that the cuts will be parallel and spaced from each other and the edges of the board the desired distances.

When it is desired to provide a duct having cross-sectional dimensions greater than is obtainable by cutting longitudinally along the maximum size board receivable in the frame 40, additional guide members are provided for use in cutting transversely of such a board, or in other words in the direction of its width so as to provide a shorter but larger cross-sectioned duct. Such a guide member is shown in broken lines at 68 in FIG. 3. While only such guide member is indicated, it will, of course, be understood, that any number of such guide members may be provided, consistent with the desired cross-section to be provided in the final duct. Although the guide members 68 would be shorter than the guide members 52 to 55, the guide members 68 would be otherwise identical in construction and use. Thus, the side members 42, 44 of the frame are provided with aligned openings 70 having indicia respectively associated therewith and corresponding in function to the indicia 64 on the end members 46, 48 of the frame. Further, the guide members 68 have pins, not shown, engagable in the openings 70 in the same manner and for the same purpose as the pins 60 engage in the openings 62. In using the device to provide cuts extending transversely of the board, the inner edge of the end frame 46, which extends at right angles to the guide members 52 to 55, would therefore extend parallel to the guide members 68 and serve as a stop or locating means for a short edge of the duct board, in the same manner and for the same purpose that the inner edge of the side frame member 42 provides a stop for the edge 22 of the duct board.

As mentioned above, the width of the frame is substantially in excess of a predetermined nominal maximum width of a duct board. More particularly, the width of the opening in the frame and the length of the slots in the guide members are greater than said nominal maximum width by an amount at least twice the length of the tools associated with the guide members, to permit the tool to be inserted between the duct board and a next adjacent frame member to start the cut and to facilitate withdrawal of the tool at the end of the cut in the same manner as described above in connection with the guide members 52-55. The indicia 72 associated with the guide members 68 may be of the same type as the indicia 64 associated with the guide members 52-55. Where a consecutive numbering system is used for the indicia 64 and it is desired to use the same numbers for the indicia 70, the numerals may be preceded with a letter on the master chart as well as on the frame, so as to indicate which sets of indicia will be utilized for a particular size duct—for example, the indicia used with the frame members 52-55 could be preceded by the letter "A" while the indicia 72 could be preceded by the letter "B."

It is a known practice to provide the tools used to make the different cuts in the duct board with different colors. For example, the tool for cutting the grooves 16 and 20 shown in FIG. 2 might be colored red, the tool for cutting the groove 18 colored white and the tool for cutting joint cut 24 colored blue. In order to facilitate the use of the device described above, the guide members are also colored or provided with colored markings corresponding to the colors of the tools with which the guide members are to be used. Also, the indicia on the frame, indicating the proper location of the guide members, may be of a color corresponding to the color of the guide member to be located at a particular position. For example, for a particular size duct, the first cut might be made at a location indicated at numeral "A–11." The master chart could then indicate the designation "A–11" in red, indicating that the red guide member 52 should be located at "A–11" and that the red tool should be used to make this cut. Where the size of the duct is directly indicated by the indicia, then, for example, the location of the guide member 52 might be indicated by red indicia, indicating the size of the duct to be formed. While coloration provides a ready means for visually identifying and determining the location of the particular guide members, other visible identification means could be provided to indicate the proper position of the guide member with such indication means being related to indication means on the tools for use with the guide members.

Thus, it will be seen that there has been provided a novel and improved means for facilitating the cutting of duct board preparatory to forming the duct board into a duct of predetermined cross-sectional configuration and dimensions. It has been found that, with the use of the device of this invention, the time required to provide the cuts in the duct board may be reduced from the 25 to 30 minutes associated with prior methods of measuring and laying off the cuts and using a straight edge to guide the tool, to something in the neighborhood of 5 minutes, thus materially improving the economy of the fabrication of the ducts and contributing to a substantial increase in the economy of the over-all installation. The device is simple to use, even by unskilled workmen, and eliminates any mathematical computations which could introduce errors into the work. The device is readily transportable from one location to another and is of a construction which is relatively economical, thus making it practical for use by small as well as large contractors.

While a preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A device for use in cutting flat fiberglass duct board having a longitudinal edge to provide in one side of the board a plurality of grooves extending parallel to and over the full length of said edge, whereby the board may thereafter be folded along said grooves into a polygonal cross-sectioned duct, comprising a frame having means for the reception of a flat duct board of predetermined maximum nominal length and width, a plurality of elongated guide means, means on the frame providing a stop engageable with said edge of a duct board to locate the same in a predetermined position relative to the frame, and means locating each of said guide means on the frame in a selected one of a plurality of positions spaced apart laterally of the guide means, said guide means extending over said means for the reception of a duct board so as to be in closely overlying relation to a board received therein and each having means for the guiding of a cutting tool in its movement longitudinally of the guide means, said guide means being spaced apart a distance which is a function of the desired cross-sectional dimensions of a duct to be formed from a board cut using said device, said guide means and said means on the frame for reception of a duct board having a length substantially in excess of said maximum nominal length, and additional tool-engageable guide means cooperable with a tool to provide a joint cut extending parallel to the grooves, said additional guide means being disposed on the side of said first-mentioned guide means opposite said stop, and means for locating said additional guide means in a selected one of a plurality of positions in each of which said additional guide means extends in parallel co-planar relation to said first-mentioned guide means.

2. A device for use in cutting flat fiberglass duct board having a longitudinal edge to provide in one side of the board a plurality of grooves extending parallel to and over the full length of said edge, whereby the board may thereafter be folded along said grooves into a polygonal cross-sectioned duct of predetermined cross-sectional dimensions, comprising a frame having means for receiving a duct board, a first set of elongated tool engageable guide means, means locating each of said guide means on the frame in a selected one of a plurality of positions spaced laterally of said guide means, and in each of which positions the guide means will extend in one direction parallel to each other and in overlying relation to said means on the frame for receiving a duct board, a second set of elongated tool engageable guide means, means for locating each of the guide means of said second set on the frame in the absence of said first set in a selected one of a plurality of positions spaced apart laterally of the guide means of said second set, and in each of which positions the guide means of said second set will extend at right angles to said one direction, each of the guide means of said first and second sets being slidably engageable by a cutting tool to guide the tool in movement thereof longitudinally of the respective guide means.

3. A device for use in cutting a flat rectangular fiberglass duct board to provide in one side of the board a plurality of grooves extending parallel to and over the full length of one edge of the board, whereby the board may thereafter be folded along said grooves into a polygonal cross-sectioned duct of predetermined cross-sectional dimensions, comprising a frame having means for the reception of a duct board of a predetermined maximum nominal length, said means for the reception of a duct board having an effective length substantially in excess of said maximum nominal length, three elongated guide members each having an elongated tool receivable guide slot extending longitudinally thereof, and means locating each of said guide members on the frame in a selected one of a plurality of positions spaced apart laterally of the guide member, said guide members extending parallel to each other and over said means for the reception of a duct board so as to overlie a duct board received therein in closely adjacent relation, each of said tool receivable slots having a length substantially in excess of said maximum nominal length, said slots being spaced apart a distance which is a function of the desired cross-sectional dimensions of the duct to be formed from a board cut using said device.

4. A device for use in cutting flat fiberglass duct board having a longitudinal edge to provide in one side of the board a plurality of grooves extending parallel to and over the full length of said edge, whereby the board may thereafter be folded along said grooves into a polygonal cross-sectioned duct of predetermined cross-sectional dimensions, comprising a frame having means for receiving a duct board, three elongated tool engageable guide means, means for locating each of said guide means on the frame in a selected one of a plurality of discrete positions spaced apart laterally of said guide means, said guide means extending parallel to each other and in overlying relation to said means on the frame for receiving a duct board, each of said guide means being slidably engageable by a cutting tool to guide the tool in movement thereof longitudinally of the guide means, said three guide means being spaced apart a distance which is a function of the desired cross-sectional dimensions of the duct formed from a board cut using said device, and means providing indicia on the frame associated with each of said discrete positions to indicate the proper position of each of said guide means with respect to a plurality of duct cross-sectional sizes.

5. A device for use in cutting a flat rectangular fiberglass duct board to provide in one side of the board a plurality of grooves extending parallel to and over the full length of one edge of the board, whereby the board may thereafter be folded along said grooves into a polygonal cross-sectioned duct of predetermined cross-sectional dimensions, comprising a frame having means for the reception of a duct board having an effective length substantially in excess of said maximum nominal length, three elongated guide members each having an elongated tool receivable guide slot extending longitudinally thereof, means for mounting each of said guide members on the frame in a selected one of a plurality of discrete positions spaced apart laterally of the guide member, said guide members extending parallel to each other and over said means for the reception of a duct board so as to overlie a duct board received therein in closely adjacent relation, each of said tool receivable slots having a length substantially in excess of said maximum nominal length, said slots being spaced apart a distance which is a function of the desired cross-sectional dimensions of the duct to be formed from a board cut using said device, and means providing indicia on the frame associated with said discrete positions and cooperable with means on the guide members to indicate the proper position of said guide members with respect to a plurality of duct cross-sectional sizes.

6. A device for use in cutting a flat fiberglass duct board having a longitudinal edge to provide in one side of the board a plurality of grooves extending parallel to and over the full length of said edge, whereby the board may thereafter be folded along said grooves into a polygonal cross-sectioned duct of predetermined cross-sectional dimensions, comprising a frame having means for receiving a duct board, a first set of elongated tool engageable guide members, a second set of tool engageable guide members, means for alternatively locating each of said guide members of the first or second set on the frame in a selected one of a plurality of positions spaced laterally of the guide member and in which position each guide member extends parallel to the other guide members of its respective set in overlying relation to said means on the frame for receiving a duct board and in which position each guide member of the first or second set of guide members extends respectively at right angles to the other set of guide members, each of said guide members having at least one surface extending longitudinally thereof which is slidably engageable with a cooperable surface on a cutting tool to guide the tool in the movement thereof longitudinally of the guide member, said guide members each having visual identification means related to visual identification means on a tool for use with the guide member, and means providing indicia on the frame associated with each of said positions and cooperable with means on the guide members to visually indicate the proper position of each guide member with respect to a plurality of duct cross-sectional sizes.

7. A system for use with a flat fiberglass duct board having a longitudinal edge to provide in one side of the board a plurality of general V-shaped grooves extending parallel to said edges and a joint cut extending parallel to said grooves and on the side thereof opposite said edge, comprising a frame having means for receiving a duct board, a plurality of parallel elongated guide means on the frame, a plurality of cutting tools cooperably engageable with said guide means to provide said grooves and joint cut in response to movement of the tools longitudinally along said guide means, one of said grooves cut in the duct board extending therein a predetermined depth which depth is less than the depth of the other said grooves, said guide means being spaced apart a distance which is a function of the desired cross-sectional dimensions of a duct to be formed from a board cut using said device, said guide means being located above the portion of the frame for receiving a duct board and arranged so as to be in closely adjacent overlying relation to a duct board received within the frame, each of said guide means having visual identification means which is related visually to identification means on one of said tools.

8. A system for use with a flat fiberglass duct board having a longitudinal edge to provide in one side of the board a plurality of generally V-shaped grooves extending parallel to and over the full length of said edge and a joint cut extending parallel to said grooves and on the side thereof opposite said edge, comprising a frame having means for receiving a duct board, a plurality of elongated tool engageable guide means, and means locating each of said guide means on the frame in a selected one of a plurality of positions spaced apart laterally of said guide means, said guide means extending parallel to each other in overlying relation to said means on the frame for receiving a duct board, a plurality of cutting tools, each of said guide means being slidably engageable by one of said cutting tools to guide the tool in movement thereof longitudinally of the guide means to cut said V-shaped grooves in the duct board, an additional elongated tool engageable guide means and an additional tool cooperative therewith to provide a joint cut extending parallel to said V-shaped grooves and opposite to said longitudinal edge of the duct board, means for locating said additional guide means in a selected one of a plurality of positions in each of which said additional guide means extends in parallel co-planar relation to said plurality of elongated guide means, said plurality of guide means and additional guide means being spaced apart a distance which is a function of the desired cross-sectional dimensions of the duct formed from a board cut using said device, all of said tools, frame and guide means having related visual identification means for indicating the proper position of each guide means on the frame and the tool to use with each guide means to provide said grooves and joint cut in a duct board in a manner and location to provide a duct of predetermined cross-sectional size and shape.

References Cited by the Examiner
UNITED STATES PATENTS

| | | | |
|---|---|---|---|
| Re. 11,365 | 9/1893 | Saltzkorn et al. | 83—5 |
| 1,117,577 | 11/1914 | Johnson | 83—455 |
| 1,515,129 | 11/1924 | Mayer | 33—26 |
| 1,612,390 | 12/1926 | Maynard | 33—32 X |
| 2,436,111 | 2/1948 | Lowe | 83—5 |
| 2,559,982 | 7/1951 | McDowell | 33—80 |
| 2,701,017 | 2/1955 | Wiedemann | 83—522 X |
| 2,915,926 | 12/1959 | Woerner | 77—62 |
| 3,003,527 | 10/1961 | Fortune | 144—136 |

WILLIAM W. DYER, JR., *Primary Examiner.*

J. M. MEISTER, *Assistant Examiner.*